US011794259B2

(12) United States Patent
Harada et al.

(10) Patent No.: US 11,794,259 B2
(45) Date of Patent: Oct. 24, 2023

(54) ROTARY CUTTING TOOL

(71) Applicant: Sumitomo Electric Hardmetal Corp., Itami (JP)

(72) Inventors: Masashi Harada, Itami (JP); Naoki Watanobe, Itami (JP); Takashi Harada, Itami (JP); Taisuke Higashi, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/779,565

(22) PCT Filed: Jun. 22, 2020

(86) PCT No.: PCT/JP2020/024452
§ 371 (c)(1),
(2) Date: May 25, 2022

(87) PCT Pub. No.: WO2021/260774
PCT Pub. Date: Dec. 30, 2021

(65) Prior Publication Data
US 2023/0015407 A1    Jan. 19, 2023

(51) Int. Cl.
*B23C 5/10*    (2006.01)

(52) U.S. Cl.
CPC .......... *B23C 5/10* (2013.01); *B23C 2210/321* (2013.01); *B23C 2210/40* (2013.01); *B23C 2250/12* (2013.01)

(58) Field of Classification Search
CPC . B23C 5/10; B23C 2210/40; B23C 2210/082; B23C 2210/321; B23C 2210/48; B23C 2210/54; B23C 2250/12; Y10T 407/1948; Y10T 407/1962; Y10T 407/489;

(Continued)

(56) References Cited

U.S. PATENT DOCUMENTS 2,322,894 A * 6/1943 Stevens .................. B23B 51/02
                                                    408/230
3,003,224 A * 10/1961 Ribich .................... B23B 51/02
                                                    407/115

(Continued)

FOREIGN PATENT DOCUMENTS

DE    112017000520 T5    10/2018
EP        3272446 A1      1/2018

(Continued)

OTHER PUBLICATIONS

Notice of Reasons for Refusal dated Sep. 21, 2021, received for JP Application 2020-571907, 6 pages including English Translation.

(Continued)

*Primary Examiner* — Sara Addisu
(74) *Attorney, Agent, or Firm* — XSENSUS LLP

(57) ABSTRACT

A rotary cutting tool according to the present disclosure is rotatable about an axial line and includes a rake face and a flank face. The flank face is contiguous to the rake face. A ridgeline between the rake face and the flank face constitutes a cutting edge. In a cross section perpendicular to the axial line, the rake face is constituted of a plurality of straight line portions.

13 Claims, 5 Drawing Sheets

(58) Field of Classification Search
CPC ............ B23B 2251/14; B23B 2250/12; B23B 27/145; B23B 2226/315
See application file for complete search history.

(56) References Cited

U.S. PATENT DOCUMENTS

| | | | | |
|---|---|---|---|---|
| 5,049,009 | A * | 9/1991 | Beck | B23C 5/10 407/42 |
| 5,160,232 | A * | 11/1992 | Maier | B23B 51/02 407/54 |
| 5,192,171 | A | 3/1993 | Ther et al. | |
| 5,209,612 | A | 5/1993 | Kish | |
| 6,368,030 | B1 * | 4/2002 | Sato | B23C 5/10 407/53 |
| 7,214,006 | B2 * | 5/2007 | Flynn | B23C 5/10 407/53 |
| 10,183,346 | B2 * | 1/2019 | Takahashi | B23C 5/10 |
| 2003/0198525 | A1 | 10/2003 | Iwamoto et al. | |
| 2006/0045637 | A1 * | 3/2006 | Flynn | B23C 5/10 407/53 |
| 2009/0092452 | A1 * | 4/2009 | Sato | B23C 5/10 407/54 |
| 2014/0133926 | A1 | 5/2014 | Budda et al. | |
| 2019/0061022 | A1 | 2/2019 | Takatake | |
| 2022/0176471 | A1 * | 6/2022 | Paletta | B23D 61/003 |

FOREIGN PATENT DOCUMENTS

| | | |
|---|---|---|
| JP | 5-228716 A | 9/1993 |
| JP | 6-8029 A | 1/1994 |
| JP | 6-91410 A | 4/1994 |
| JP | 10-86014 A | 4/1998 |
| JP | 2003-311524 A | 11/2003 |
| JP | 2006-110667 A | 4/2006 |
| JP | 2017-159380 A | 9/2017 |

OTHER PUBLICATIONS

Decision to Grant dated Jan. 4, 2022, received for JP Application 2020-571907, 5 pages including English Translation.

* cited by examiner

ROTARY CUTTING TOOL

CROSS-REFERENCE TO RELATED APPLICATION

The present application is based on PCT/JP20201024452 filed on Jun. 22, 2020, the entire contents of which is incorporated herein by reference.

TECHNICAL FIELD

The present disclosure relates to a rotary cutting tool.

BACKGROUND ART

Japanese Patent Laying-Open No. 2017-159380 (PTL 1) discloses an end mill having a rake face in which a plurality of streaks (recesses) are formed.

CITATION LIST

Patent Literature

PTL 1: Japanese Patent Laying-Open No. 2017-159380

SUMMARY OF INVENTION

A rotary cutting tool according to the present disclosure is rotatable about an axial line and includes a rake face and a flank face. The flank face is contiguous to the rake face. A ridgeline between the rake face and the flank face constitutes a cutting edge. In a cross section perpendicular to the axial line, the rake face is constituted of a plurality of straight line portions.

DETAILED DESCRIPTION

Figure 1:
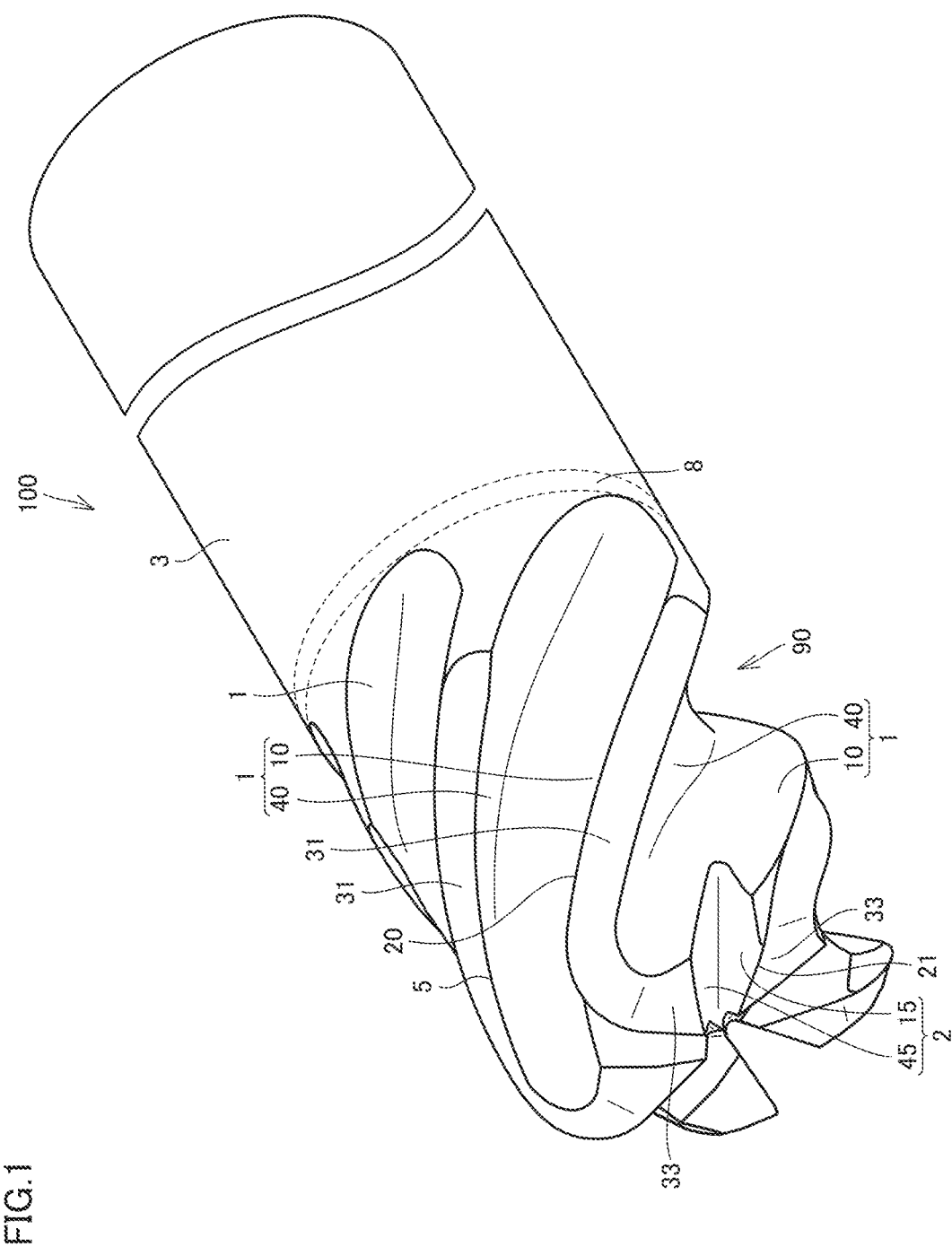
FIG. 1 is a schematic perspective view showing a configuration of a rotary cutting tool according to the present embodiment.

Problem to be Solved by the Present Disclosure

When a workpiece is cut using a rotary cutting tool, centrifugal force acts on coolant, so that it is difficult to retain the coolant in the vicinity of a cutting point while effectively transporting the coolant to the vicinity of the cutting point. In the end mill described in Japanese Patent Laying-Open No. 2017-159380, the coolant is retained in a valley portion of a recess provided in the rake face, thereby improving lubricity. However, in the end mill, when large cutting resistance is applied to the cutting edge, stress is concentrated in the recess, with the result that a cutting edge may be broken.

Advantageous Effect of the Present Disclosure

According to the present disclosure, there can be provide a rotary cutting tool to suppress breakage of a cutting edge.

DESCRIPTION OF EMBODIMENTS

First, an overview of embodiments of the present disclosure will be described.

(1) A rotary cutting tool 100 according to the present disclosure is rotatable about an axial line A and includes a rake face 10 and a flank face 31. Flank face 31 is contiguous to rake face 10. A ridgeline between rake face 10 and flank face 31 constitutes a cutting edge 20. In a cross section perpendicular to axial line A, rake face 10 is constituted of a plurality of straight line portions.

(2) In rotary cutting tool 100 according to (1), a difference between a maximum value of an angle formed by two adjacent straight line portions of the plurality of straight line portions and a minimum value of the angle may be more than or equal to 8°.

(3) In rotary cutting tool 100 according to (1) or (2), the plurality of straight line portions may include a first straight line portion 11, a second straight line portion 12, a third straight line portion 13, and a fourth straight line portion 14, first straight line portion 11 being contiguous to flank face 31, second straight line portion 12 being inclined with respect to first straight line portion 11, second straight line portion 12 being contiguous to first straight line portion 11, third straight line portion 13 being inclined with respect to second straight line portion 12, third straight line portion 13 being contiguous to second straight line portion 12, fourth straight line portion 14 being inclined with respect to third straight line portion 13, fourth straight line portion 14 being contiguous to third straight line portion 13. A first angle θ1 formed by first straight line portion 11 and second straight line portion 12 may be more than a second angle θ2 formed by second straight line portion 12 and third straight line portion 13. Second angle θ2 may be more than a third angle θ3 formed by third straight line portion 13 and fourth straight line portion 14.

Details of Embodiments of the Present Disclosure

Hereinafter, the embodiments of the present disclosure (hereinafter, also referred to as "the present embodiment") will be described in detail with reference to figures. It should be noted that in the below-described figures, the same or corresponding portions are denoted by the same reference characters, and will not be described repeatedly.

Figure 2:
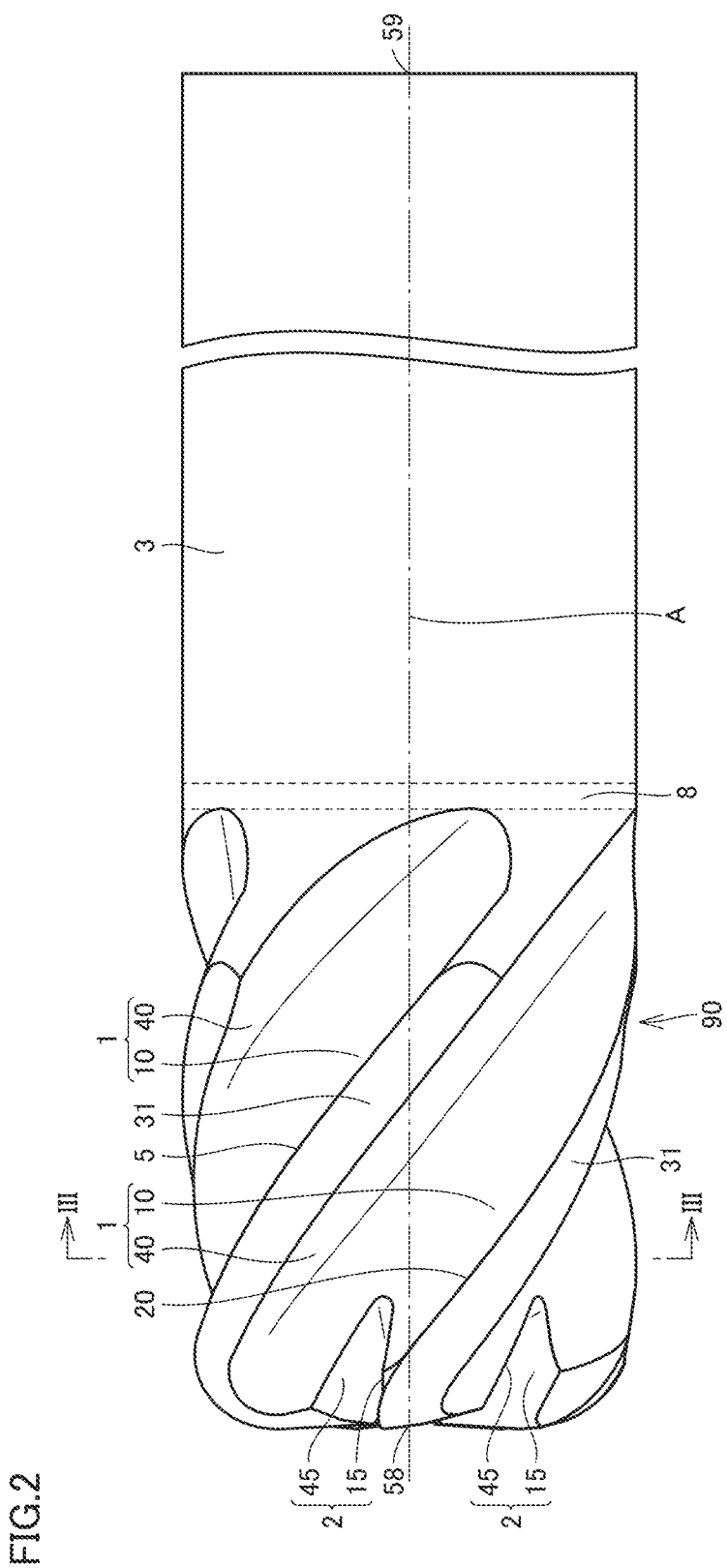
FIG. 2 is a schematic side view showing the configuration of the rotary cutting tool according to the present embodiment.

FIG. 1 is a schematic perspective view showing a configuration of a rotary cutting tool 100 according to the present embodiment. FIG. 2 is a schematic side view showing the configuration of rotary cutting tool 100 according to the present embodiment. As shown in FIGS. 1 and 2, rotary cutting tool 100 according to the present embodiment is, for example, an end mill, and is constituted of a cutting edge portion 90, a joint portion 8, and a shank portion 3. Cutting edge portion 90 has first rake faces 10, first flank faces 31, second rake faces 15, second flank faces 33, outer peripheral cutting edges 20, bottom cutting edges 21, and a front end 58. Shank portion 3 has a rear end 59. Cutting edge portion 90 is fixed to shank portion 3 by joint portion 8. Joint portion 8 is a brazing material. Joint portion 8 is located between cutting edge portion 90 and shank portion 3.

Rotary cutting tool 100 is rotatable about an axial line A. From another viewpoint, it can be said that axial line A is a rotation axis of rotary cutting tool 100. A material of cutting edge portion 90 includes a cubic boron nitride (cBN) sintered material, for example. The material of cutting edge portion 90 may include diamond. The diamond may be a single-crystal diamond or a polycrystalline diamond. Shank portion 3 includes a cemented carbide, for example. The cemented carbide is, for example, a tungsten carbide (WC)-based cemented carbide, a cemented carbide including Co in addition to WC, or a cemented carbide having a carbonitride of Cr, Ti, Ta, Nb, or the like added therein in addition to WC.

Front end 58 of rotary cutting tool 100 is a portion to face a workpiece. Rear end 59 of rotary cutting tool 100 is a portion to face a tool for rotating rotary cutting tool 100. Shank portion 3 is a portion to be attached to the tool for rotating rotary cutting tool 100. A direction along axial line A is an axial direction. A direction perpendicular to the axial direction is a radial direction. In the present specification, a direction from front end 58 toward rear end 59 is referred to as "rearward in the axial direction". On the other hand, a direction from rear end 59 toward front end 58 is referred to as "forward in the axial direction".

As shown in FIGS. 1 and 2, each of first flank faces 31 is contiguous to a corresponding one of first rake faces 10. A ridgeline between first rake face 10 and first flank face 31 constitutes outer peripheral cutting edge 20. Each of second flank faces 33 is contiguous to a corresponding one of second rake faces 15. A ridgeline between second rake face 15 and second flank face 33 constitutes bottom cutting edge 21. First rake face 10 is contiguous to second rake face 15. First rake face 10 is located rearward in the axial direction with respect to second rake face 15. First flank face 31 is contiguous to second flank face 33. First flank face 31 is located rearward in the axial direction with respect to second flank face 33.

First swarf discharging flutes 1 and second swarf discharging flutes 2 are formed in cutting edge portion 90 of rotary cutting tool 100. Each of first swarf discharging flutes 1 is constituted of first rake face 10 and a first swarf discharging surface 40. Each of second swarf discharging flutes 2 is constituted of second rake face 15 and a second swarf discharging surface 45. Second swarf discharging surface 45 is contiguous to first swarf discharging surface 40. First swarf discharging flute 1 is provided helically around axial line A. Second swarf discharging flute 2 is contiguous to first swarf discharging flute 1. In the direction along axial line A, the length of first swarf discharging flute 1 is longer than the length of second swarf discharging flute 2.

Rotary cutting tool 100 according to the present embodiment is, for example, a multi-edged tool. Specifically, the number of outer peripheral cutting edges 20 is, for example, more than or equal to 2. The lower limit of the number of outer peripheral cutting edges 20 is not particularly limited, and may be, for example, more than or equal to 4, or more than or equal to 8. The upper limit of the number of outer peripheral cutting edges 20 is not particularly limited, and may be, for example, less than or equal to 20, or less than or equal to 16. In rotary cutting tool 100 shown in FIG. 1, the number of outer peripheral cutting edges 20 is 5. The number of bottom cutting edges 21 may be the same as the number of outer peripheral cutting edges 20.

Figure 3:
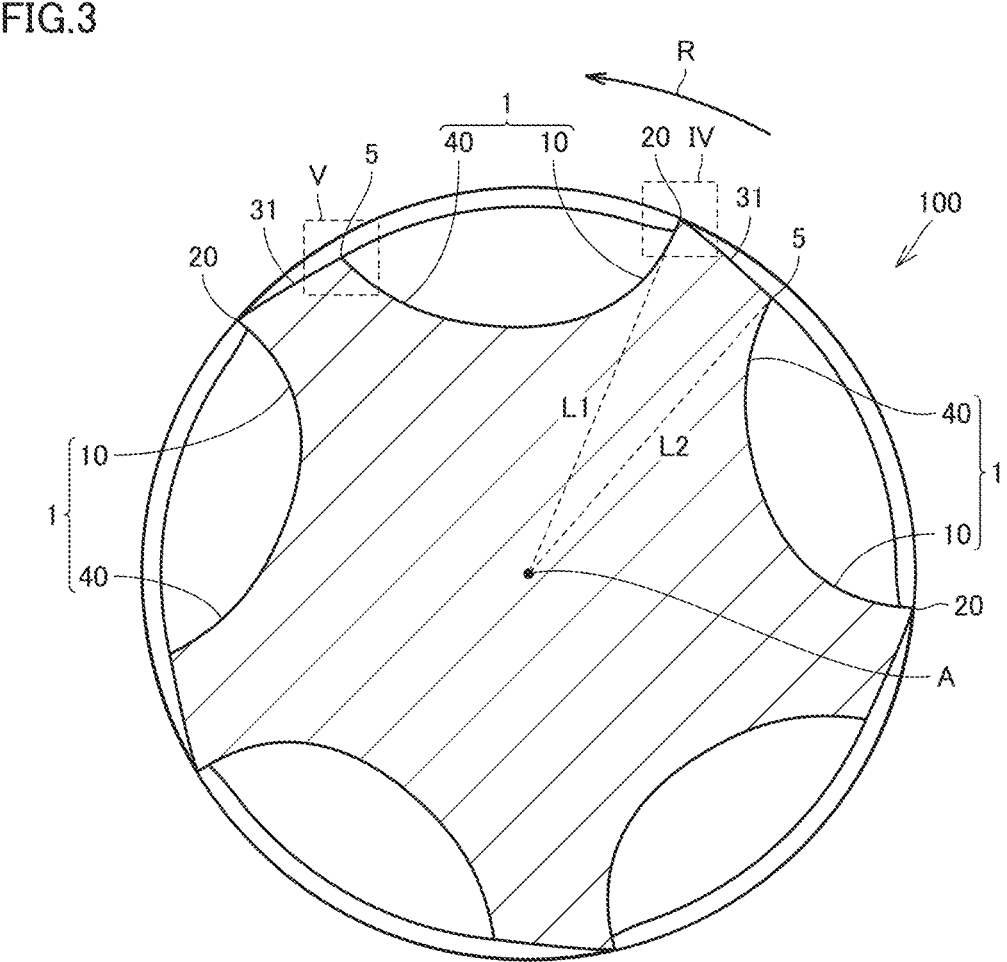
FIG. 3 is a schematic cross sectional view when viewed along a line III-III of FIG. 2.

FIG. 3 is a schematic cross sectional view when viewed along a line III-III of FIG. 2. The cross section is a cross section perpendicular to the axial line. As shown in FIG. 3, the plurality of first swarf discharging flutes 1 are disposed in a peripheral direction (rotation direction R). Similarly, the plurality of first flank faces 31 are disposed in the peripheral direction. Similarly, the plurality of outer peripheral cutting edges 20 are disposed in the peripheral direction. That is, when a combination of a first flank face 31, a first swarf discharging flute 1, and an outer peripheral cutting edge 20 is assumed as one cutting component, a plurality of cutting components are disposed in the peripheral direction. In each of the cutting components, first swarf discharging flute 1 is located forward in the rotation direction with respect to first flank face 31. In the cutting component, first rake face 10 is located forward in the rotation direction with respect to outer peripheral cutting edge 20. In the cutting component, first swarf discharging surface 40 is located forward in the rotation direction with respect to first rake face 10.

As shown in FIG. 3, first flank faces 31 and first swarf discharging flutes 1 are alternately located in rotation direction R. One end of each first flank face 31 constitutes outer peripheral cutting edge 20. The other end of first flank face 31 constitutes a tail portion 5. First flank face 31 is contiguous to first rake face 10 at outer peripheral cutting edge 20. First flank face 31 is contiguous to first swarf discharging surface 40 at tail portion 5. In the radial direction, a length (first length L1) from axial line A to outer peripheral cutting edge 20 is longer than a length (second length L2) from axial line A to tail portion 5.

Figure 4:
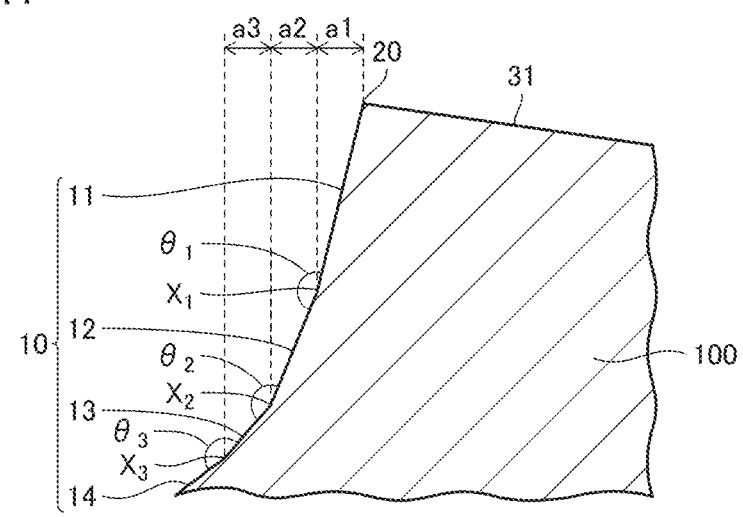
FIG. 4 is an enlarged schematic view of a region IV in FIG. 3.

FIG. 4 is an enlarged schematic view of a region IV in FIG. 3. As shown in FIG. 4, in the cross section perpendicular to axial line A, first rake face 10 is constituted of a plurality of straight line portions. For example, the plurality of straight line portions include a first straight line portion 11, a second straight line portion 12, a third straight line portion 13, and a fourth straight line portion 14. First straight line portion 11 is contiguous to first flank face 31. First straight line portion 11 is inclined with respect to first flank face 31. A boundary between first straight line portion 11 and first flank face 31 is outer peripheral cutting edge 20. Second straight line portion 12 is inclined with respect to first straight line portion 11. Second straight line portion 12 is contiguous to first straight line portion 11. Second straight line portion 12 is located opposite to first flank face 31 with respect to first straight line portion 11. From another viewpoint, it can be said that first straight line portion 11 is located between second straight line portion 12 and first flank face 31.

Third straight line portion 13 is inclined with respect to second straight line portion 12. Third straight line portion 13 is contiguous to second straight line portion 12. Third straight line portion 13 is located opposite to first straight line portion 11 with respect to second straight line portion 12. From another viewpoint, it can be said that second straight line portion 12 is located between third straight line portion 13 and first straight line portion 11. Fourth straight line portion 14 is inclined with respect to third straight line portion 13. Fourth straight line portion 14 is contiguous to third straight line portion 13. Fourth straight line portion 14 is located opposite to second straight line portion 12 with respect to third straight line portion 13. From another viewpoint, it can be said that third straight line portion 13 is located between fourth straight line portion 14 and second straight line portion 12.

An angle formed by two adjacent straight line portions of the plurality of straight line portions may become smaller in a direction further away from first flank face 31. Specifically, a first angle $\theta_1$ formed by first straight line portion 11 and second straight line portion 12 may be more than a second angle $\theta_2$ formed by second straight line portion 12 and third straight line portion 13. Second angle $\theta_2$ formed by second straight line portion 12 and third straight line portion 13 may be more than a third angle $\theta_3$ formed by third straight line portion 13 and fourth straight line portion 14. First angle $\theta_1$ is more than or equal to 140° and less than 180°, for example. The lower limit of first angle $\theta_1$ is not particularly limited, and may be more than or equal to 150° or may be more than or equal to 160°, for example. The upper limit of first angle $\theta_1$ is not particularly limited, and may be less than or equal to 178° or may be less than or equal to 175°, for example.

A boundary between first straight line portion 11 and second straight line portion 12 is a first position $X_1$. A boundary between second straight line portion 12 and third straight line portion 13 is a second position $X_2$. A boundary between third straight line portion 13 and fourth straight line portion 14 is a third position $X_3$. The length of first straight line portion 11 (distance in a straight line between outer peripheral cutting edge 20 and first position $X_1$) may be larger than the length of second straight line portion 12 (distance in a straight line between first position $X_1$ and second position $X_2$). The length of second straight line portion 12 (distance in a straight line between first position $X_1$ and second position $X_2$) may be larger than the length of third straight line portion 13 (distance in a straight line between second position $X_2$ and third position $X_3$).

In the rotation direction, a distance (first distance a1) between outer peripheral cutting edge 20 and first position $X_1$ may be the same as a distance (second distance a2) between first position $X_1$ and second position $X_2$. In the radial direction, the distance (second distance a2) between first position $X_1$ and second position $X_2$ may be the same as a distance (third distance a3) between second position $X_2$ and third position $X_3$.

Figure 5:
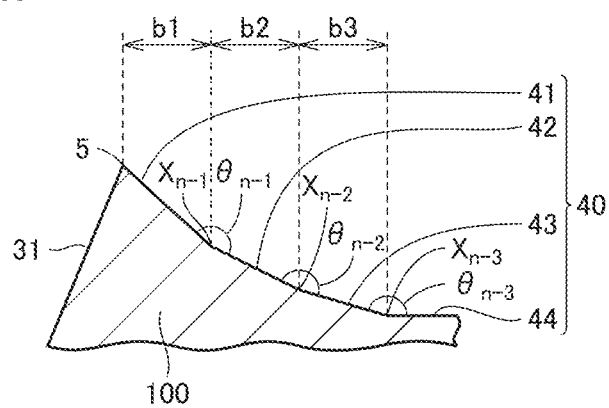
FIG. 5 is an enlarged schematic view of a region V in FIG. 3.

FIG. 5 is an enlarged schematic view of a region V in FIG. 3. In the cross section perpendicular to axial line A, first swarf discharging surface 40 may be constituted of, for example, a plurality of straight line portions. First swarf discharging surface 40 has, for example, a fifth straight line portion 41, a sixth straight line portion 42, a seventh straight line portion 43, and an eighth straight line portion 44. Fifth straight line portion 41 is inclined with respect to first flank face 31. Fifth straight line portion 41 is contiguous to tail portion 5. Sixth straight line portion 42 is inclined with respect to fifth straight line portion 41. Sixth straight line portion 42 is contiguous to fifth straight line portion 41. Sixth straight line portion 42 is located opposite to tail portion 5 with respect to fifth straight line portion 41. From another viewpoint, it can be said that fifth straight line portion 41 is located between sixth straight line portion 42 and tail portion 5.

Seventh straight line portion 43 is inclined with respect to sixth straight line portion 42. Seventh straight line portion 43 is contiguous to sixth straight line portion 42. Seventh straight line portion 43 is located opposite to fifth straight line portion 41 with respect to sixth straight line portion 42. From another viewpoint, it can be said that sixth straight line portion 42 is located between seventh straight line portion 43 and fifth straight line portion 41. Eighth straight line portion 44 is inclined with respect to seventh straight line portion 43. Eighth straight line portion 44 is contiguous to seventh straight line portion 43. Eighth straight line portion 44 is located opposite to sixth straight line portion 42 with respect to seventh straight line portion 43. From another viewpoint, it can be said that seventh straight line portion 43 is located between eighth straight line portion 44 and sixth straight line portion 42.

A fourth angle $\theta_{n-1}$ formed by fifth straight line portion 41 and sixth straight line portion 42 may be more than a fifth angle $\theta_{n-2}$ formed by sixth straight line portion 42 and seventh straight line portion 43. Fifth angle $\theta_{n-2}$ formed by sixth straight line portion 42 and seventh straight line portion 43 may be more than a sixth angle $\theta_{n-3}$ formed by seventh straight line portion 43 and eighth straight line portion 44.

A boundary between fifth straight line portion 41 and sixth straight line portion 42 is a fourth position $X_{n-1}$. A boundary between sixth straight line portion 42 and seventh straight line portion 43 is a fifth position $X_{n-2}$. A boundary between seventh straight line portion 43 and eighth straight line portion 44 is a sixth position $X_{n-3}$. The length of fifth straight line portion 41 (distance in a straight line between tail portion 5 and fourth position $X_{n-1}$) may be larger than the length of sixth straight line portion 42 (distance in a straight line between fourth position $X_{n-1}$ and fifth position $X_{n-2}$). The length of sixth straight line portion 42 (distance in a straight line between fourth position $X_{n-1}$ and fifth position $X_{n-2}$) may be larger than the length of seventh straight line portion 43 (distance in a straight line between fifth position $X_{n-2}$ and sixth position $X_{n-3}$).

In the rotation direction, a distance (fourth distance b1) between tail portion 5 and fourth position $X_{n-1}$ may be the same as a distance (fifth distance b2) between fourth position $X_{n-1}$ and fifth position $X_{n-2}$. In the radial direction, the distance (fifth distance b2) between fourth position $X_{n-1}$ and fifth position $X_{n-2}$ may be the same as a distance (sixth distance b3) between fifth position $X_{n-2}$ and sixth position $X_{n-3}$.

Figure 6:
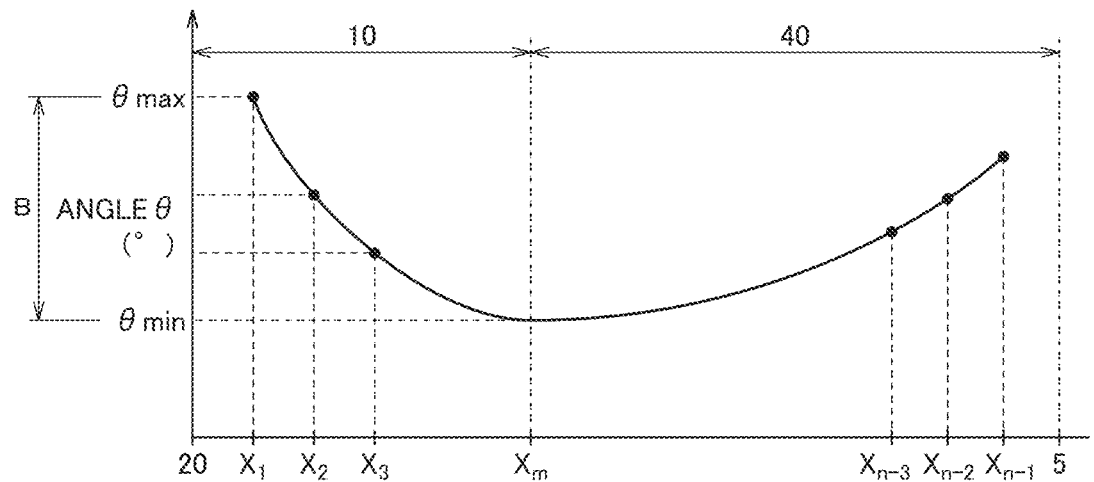
FIG. 6 is a diagram showing a relation between an angle formed by two adjacent straight line portions and a position in a swarf discharging flute.

FIG. 6 is a diagram showing a relation between the angle formed by two adjacent straight line portions and the position in the first swarf discharging flute. As shown in FIG. 6, in first rake face 10, the angle formed by two adjacent straight line portions may be monotonously decreased in the direction from outer peripheral cutting edge 20 toward first swarf discharging surface 40. In the cross section perpendicular to axial line A, rake face 10 may be constituted of, for example, more than or equal to 5 straight line portions. Similarly, in first swarf discharging surface 40, the angle formed by two adjacent straight line portions may be monotonously decreased in the direction from tail portion 5 toward first rake face 10. In the cross section perpendicular to axial line A, first swarf discharging surface 40 may be constituted of, for example, more than or equal to 5 straight line portions. In the cross section perpendicular to axial line A, the surface of first swarf discharging flute 1 may be constituted of a plurality of straight line portions.

The lower limit of the number of the straight line portions is not particularly limited, and may be more than or equal to 10 or may be more than or equal to 20, for example. The upper limit of the number of the straight line portions is not particularly limited, and may be less than or equal to 50 or may be less than or equal to 40, for example.

As shown in FIG. 6, in rake face 10, a difference (angle difference B) between the maximum value of the angle formed by two adjacent straight line portions and the minimum value of the angle formed by two adjacent straight line portions is, for example, more than or equal to 8°. The lower limit of angle difference B is not particularly limited, and may be more than or equal to 10° or may be more than or equal to 12°, for example. The upper limit of angle difference B is not particularly limited, and may be less than or equal to 30°, for example.

Rotary cutting tool 100 is, for example, an end mill, but is not limited to the end mill. Rotary cutting tool 100 may be, for example, a reamer, a drill, or a tap.

Next, functions and effects of rotary cutting tool 100 according to the present embodiment will be described.

Figure 7:
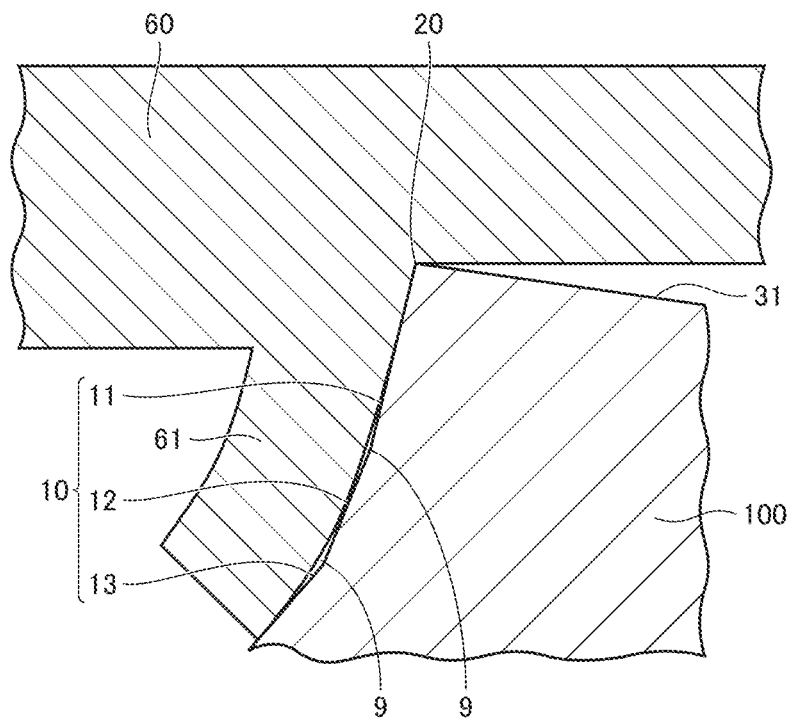
FIG. 7 is a schematic cross sectional view showing a state in which cutting is performed using the rotary cutting tool according to the present embodiment.

FIG. 7 is a schematic cross sectional view showing a state in which cutting is performed using rotary cutting tool 100 according to the present embodiment. As shown in FIG. 7, swarf 61 of a workpiece 60 cut by cutting edge 20 of rotary cutting tool 100 is discharged with swarf 61 being in contact with rake face 10. When frictional force between swarf 61 and rake face 10 is high, swarf 61 may be melted and adhered to rake face 10. The melting and adhesion of swarf 61 may lead to breakage of cutting edge 20.

According to rotary cutting tool 100 of the present disclosure, in the cross section perpendicular to axial line A, rake face 10 is constituted of the plurality of straight line portions. Specifically, in the cross section perpendicular to axial line A, rake face 10 has first straight line portion 11, second straight line portion 12, and third straight line portion 13, second straight line portion 12 being inclined with respect to first straight line portion 11, second straight line portion 12 being contiguous to first straight line portion 11, third straight line portion 13 being inclined with respect to second straight line portion 12, third straight line portion 13 being contiguous to second straight line portion 12. When swarf 61 is moved on rake face 10, swarf 61 is curled at a certain curvature. Therefore, a space 9 is formed between curled swarf 61 and the boundary between first straight line portion 11 and second straight line portion 12. Similarly, a space 9 is formed between curled swarf 61 and the boundary between second straight line portion 12 and third straight line portion 13. When cutting workpiece 60, coolant is drawn into spaces 9 by capillary action. This allows the coolant to be effectively transported to and retained in the vicinity of the cutting point. As a result, frictional force between swarf 61 and rake face 10 can be reduced. Therefore, breakage of cutting edge 20 can be suppressed.

EXAMPLES (Preparation of Samples)

First, rotary cutting tools 100 of samples 1 to 8 were prepared. Rotary cutting tools 100 of samples 1 to 6 are end mills according to examples of the present disclosure. Rotary cutting tool 100 of sample 8 is an end mill according to a comparative example. A cBN sintered material is brazed to the tip of the shank portion composed of cemented carbide. In each of rotary cutting tools 100 of samples 1 to 7, a plurality of straight line portions are formed in the surface of the swarf discharging flute provided helically in the cBN sintered material. The plurality of straight line portions are formed by performing a finishing process onto the surface (rake face) of the swarf discharging flute using a grindstone provided with straight line portions. The process is performed multiple times while changing the angle of the grindstone. In rotary cutting tool 100 of sample 8, the surface (rake face) of the swarf discharging flute is curved.

In the rotary cutting tool of sample 1, the number of the straight line portions in first swarf discharging flute 1 was 5. The maximum value of the angle formed by two adjacent straight line portions was 178°. The minimum value of the angle formed by two adjacent straight line portions was 151°. A difference between the maximum value of the angle and the minimum value of the angle was 27°.

In the rotary cutting tool of sample 2, the number of the straight line portions in first swarf discharging flute 1 was 10. The maximum value of the angle formed by two adjacent straight line portions was 178°. The minimum value of the angle formed by two adjacent straight line portions was 155°. A difference between the maximum value of the angle and the minimum value of the angle was 23°.

In the rotary cutting tool of sample 3, the number of the straight line portions in first swarf discharging flute 1 was 20. The maximum value of the angle formed by two adjacent straight line portions was 178°. The minimum value of the angle formed by two adjacent straight line portions was 162°. A difference between the maximum value of the angle and the minimum value of the angle was 16°.

In the rotary cutting tool of sample 4, the number of the straight line portions in first swarf discharging flute 1 was 30. The maximum value of the angle formed by two adjacent straight line portions was 178°. The minimum value of the angle formed by two adjacent straight line portions was 168°. A difference between the maximum value of the angle and the minimum value of the angle was 10°.

In the rotary cutting tool of sample 5, the number of the straight line portions in first swarf discharging flute 1 was 10. The maximum value of the angle formed by two adjacent straight line portions was 175°. The minimum value of the angle formed by two adjacent straight line portions was 163°. A difference between the maximum value of the angle and the minimum value of the angle was 12°.

In the rotary cutting tool of sample 6, the number of the straight line portions in first swarf discharging flute 1 was 10. The maximum value of the angle formed by two adjacent straight line portions was 175°. The minimum value of the angle formed by two adjacent straight line portions was 167°. A difference between the maximum value of the angle and the minimum value of the angle was 8°.

In the rotary cutting tool of sample 7, the number of the straight line portions in first swarf discharging flute 1 was 40. The maximum value of the angle formed by two adjacent straight line portions was 176°. The minimum value of the angle formed by two adjacent straight line portions was 171°. A difference between the maximum value of the angle and the minimum value of the angle was 5°.

(Evaluation Method)

Next, workpieces 60 were processed using respective rotary cutting tools 100 of samples 1 to 8 (see FIG. 7). Each of workpieces 60 was Ti-6Al-4V. A cutting speed (Vc) was set to 300 m/min. A feed amount (f) was set to 0.01 mm/cutting edge. A cut amount (Ae) in the lateral direction was set to 0.1 mm. A cut amount (Ap) in the axial direction was set to 0.5 mm. Coolant was an emulsion diluted by 20 times.

(Evaluation Results)

TABLE 1

| Specimens | Number of Straight Line Portions | θ max | θ min | θ max − θ min | Tool Life |
| --- | --- | --- | --- | --- | --- |
| Sample 1 | 5 | 178 | 151 | 27 | 38 Minutes |
| Sample 2 | 10 | 178 | 155 | 23 | 41 Minutes |
| Sample 3 | 20 | 178 | 162 | 16 | 43 Minutes |
| Sample 4 | 30 | 178 | 168 | 10 | 50 Minutes |
| Sample 5 | 10 | 175 | 163 | 12 | 45 Minutes |
| Sample 6 | 10 | 175 | 167 | 8 | 46 Minutes |

TABLE 1-continued

| Specimens | Number of Straight Line Portions | θ max | θ min | θ max − θ min | Tool Life |
|---|---|---|---|---|---|
| Sample 7 | 40 | 176 | 171 | 5 | 20 Minutes |
| Sample 8 | 0 | — | — | — | 10 Minutes |

Table 1 shows tool lives when workpieces 60 were processed using respective rotary cutting tools 100 of samples 1 to 8. Each of the tool lives represents a period of time from the start of the processing until breakage of the cutting edge. As shown in Table 1, each of the tool lives when workpieces 60 were processed using rotary cutting tools 100 of samples 1 to 7 was more than or equal to 20 minutes and less than or equal to 50 minutes. On the other hand, the tool life when workpiece 60 was processed using rotary cutting tool 100 of sample 8 was 10 minutes. In view of the above results, it was proved that breakage of the cutting edge can be suppressed when rake face 10 is constituted of the plurality of straight line portions in the cross section perpendicular to axial line A. Also, it was proved that breakage of the cutting edge can be further suppressed when the difference between the maximum value and minimum value of the angle formed by two adjacent straight line portions is more than or equal to 8°.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: first swarf discharging flute; 2: second swarf discharging flute; 3: shank portion; 5: tail portion; 8: joint portion; 9: space; 10: first rake face (rake face); 11: first straight line portion; 12: second straight line portion; 13: third straight line portion; 14: fourth straight line portion; 15: second rake face; 20: cutting edge (outer peripheral cutting edge); 21: bottom cutting edge; 31 first flank face (flank face); 33: second flank face; 40: first swarf discharging surface; 41: fifth straight line portion; 42: sixth straight line portion; 43: seventh straight line portion; 44: eighth straight line portion; 45: second swarf discharging surface; 58: front end; 59: rear end; 60: workpiece; 61: swarf; 90: cutting edge portion; 100: rotary cutting tool; A: axial line; B: angle difference; L1: first length; L2: second length; R: rotation direction; $X_1$: first position; $X_2$: second position; $X_3$: third position; $X_{n-1}$: fourth position; $X_{n-2}$: fifth position; sixth position; a1: first distance; a2: second distance; a3: third distance; b1: fourth distance; b2: fifth distance; b3: sixth distance; $\theta_1$: first angle; $\theta_2$: second angle; $\theta_3$: third angle; $\theta_{n-2}$: fourth angle; $\theta_{n-2}$: fifth angle; $\theta_{n-3}$: sixth angle.

The invention claimed is:

1. A rotary cutting tool rotatable about an axial line, the rotary cutting tool comprising:
   a rake face; and
   a flank face contiguous to the rake face, wherein
   a ridgeline between the rake face and the flank face constitutes a cutting edge,
   in a cross section perpendicular to the axial line, the rake face is constituted of a plurality of straight line portions,
   a swarf discharging flute is formed in the rotary cutting tool,
   the swarf discharging flute is provided helically around the axial line,
   a portion of the swarf discharging flute is constituted of the rake face,
   the plurality of straight line portions include a first straight line portion and a second straight line portion, the first straight line portion being contiguous to the flank face, the second straight line portion being inclined with respect to the first straight line portion, the second straight line portion being contiguous to the first straight line portion, a first angle formed by the first straight line portion and the second straight line portion is more than or equal to 160°,
   wherein the plurality of straight line portions of the rake face form a concave edge.

2. The rotary cutting tool according to claim 1, wherein a difference between a maximum value of an angle formed by two adjacent straight line portions of the plurality of straight line portions and a minimum value of the angle is more than or equal to 8°.

3. The rotary cutting tool according to claim 1, wherein the plurality of straight line portions include a third straight line portion and a fourth straight line portion, the third straight line portion being inclined with respect to the second straight line portion, the third straight line portion being contiguous to the second straight line portion, the fourth straight line portion being inclined with respect to the third straight line portion, the fourth straight line portion being contiguous to the third straight line portion, the first angle is more than a second angle-formed by the second straight line portion and the third straight line portion, and
   the second angle is more than a third angle formed by the third straight line portion and the fourth straight line portion.

4. The rotary cutting tool according to claim 2, wherein the plurality of straight line portions include a third straight line portion and a fourth straight line portion, the third straight line portion being inclined with respect to the second straight line portion, the third straight line portion being contiguous to the second straight line portion, the fourth straight line portion being inclined with respect to the third straight line portion, the fourth straight line portion being contiguous to the third straight line portion,
   the first angle is more than a second angle formed by the second straight line portion and the third straight line portion, and
   the second angle is more than a third angle formed by the third straight line portion and the fourth straight line portion.

5. The rotary cutting tool according to claim 1, wherein rake face includes at least four straight line portions.

6. The rotary cutting tool according to claim 1, wherein the plurality of straight line portions include a third straight line portion and a fourth straight line portion, the third straight line portion being inclined with respect to the second straight line portion, the third straight line portion being contiguous to the second straight line portion, the fourth straight line portion being inclined with respect to the third straight line portion, the fourth straight line portion being contiguous to the third straight line portion.

7. The rotary cutting tool according to claim 5, wherein a difference between a maximum value of an angle formed by two adjacent straight line portions of the plurality of straight line portions and a minimum value of the angle is more than or equal to 8°.

8. The rotary cutting tool according to claim 6, wherein a difference between a maximum value of an angle formed by two adjacent straight line portions of the plurality of straight line portions and a minimum value of the angle is more than or equal to 8°.

9. The rotary cutting tool according to claim 1, Wherein the swarf discharging flute includes a swarf discharging surface.

10. The rotary cutting tool according to claim 9, wherein the swarf discharging surface includes a plurality of straight line portions.

11. The rotary cutting tool according to claim 10, wherein the plurality of straight line portions of the swarf discharging surface include a fifth straight line portion and a sixth straight line portion, the sixth straight line portion being inclined with respect to the fifth straight line portion, and the sixth straight line portion being contiguous to the fifth straight line portion.

12. The rotary cutting tool according to claim 11, wherein the plurality of straight line portions of the swarf discharging surface include a seventh straight line portion and an eighth straight line portion, the seventh straight line portion being inclined with respect to the sixth straight line portion, the seventh straight line portion being contiguous to the sixth straight line portion, the eighth straight line portion being inclined with respect to the seventh straight line portion, and the eighth straight line portion being contiguous to the seventh straight line portion.

13. The rotary cutting tool according to claim 10, wherein swarf discharging surface includes at least four straight line portions.

* * * * *